US008648881B2

(12) United States Patent
Yamada

(10) Patent No.: US 8,648,881 B2
(45) Date of Patent: Feb. 11, 2014

(54) METHOD AND APPARATUS FOR IMAGE PROCESSING FOR IN-VEHICLE CAMERAS

(75) Inventor: Masahiro Yamada, Kobe (JP)

(73) Assignee: Fujitsu Ten Limited, Kobe-shi (JP)

( * ) Notice: Subject to any disclaimer, the term of this patent is extended or adjusted under 35 U.S.C. 154(b) by 394 days.

(21) Appl. No.: 12/591,675

(22) Filed: Nov. 27, 2009

(65) Prior Publication Data

US 2010/0134519 A1 Jun. 3, 2010

(30) Foreign Application Priority Data

Dec. 1, 2008 (JP) ................................ 2008-306905

(51) Int. Cl.
*G06T 7/00* (2006.01)
*G09G 5/00* (2006.01)

(52) U.S. Cl.
USPC ........................... 345/672; 382/104; 348/148

(58) Field of Classification Search
USPC ......................................... 348/118–120, 148
See application file for complete search history.

(56) References Cited

U.S. PATENT DOCUMENTS

| 5,850,254 | A  | * | 12/1998 | Takano et al. ................. | 348/148 |
| 6,785,404 | B1 | * | 8/2004  | Shimazaki et al. ............ | 382/104 |
| 7,161,616 | B1 | * | 1/2007  | Okamoto et al. ............. | 348/148 |
| 2003/0108222 | A1 | * | 6/2003 | Sato et al. ..................... | 382/104 |
| 2006/0022810 | A1 | * | 2/2006 | Inoue et al. ................... | 340/435 |

FOREIGN PATENT DOCUMENTS

| JP | B-3300334 | 7/2002 |
| JP | A-2006-074105 | 3/2006 |
| JP | A-2006-135797 | 5/2006 |
| JP | A-2007-302238 | 11/2007 |
| JP | A-2007-329611 | 12/2007 |
| JP | A-2008-042235 | 2/2008 |
| WO | WO 00/64175 | 10/2000 |

OTHER PUBLICATIONS

Office Action dated Jan. 29, 2013 issued in Japanese Patent Application No. 2008-306905 (with translation).

* cited by examiner

*Primary Examiner* — James A Thompson
*Assistant Examiner* — Fikru Gennene
(74) *Attorney, Agent, or Firm* — Oliff PLC

(57) ABSTRACT

An image processing apparatus has stored therein in advance, as image conversion parameters to coordinate-convert images acquired by in-vehicle cameras incorporated at different positions in an own vehicle, directions connecting between a sight-line starting position of a driver and predetermined positions of the own vehicle, values of a depression angle from the sight-line starting position of the driver, and a range that the driver is caused to visualize, for each of the in-vehicle cameras, corresponding to a state of the own vehicle. The image processing apparatus receives from the driver an input of a display output condition, and determines a current state of the own vehicle. The image processing apparatus acquires the image conversion parameters based on the display output condition and the current state of the own vehicle, and converts images captured by the in-vehicle cameras, by using the acquired image conversion parameters, and outputs the images.

6 Claims, 8 Drawing Sheets

FIG.6
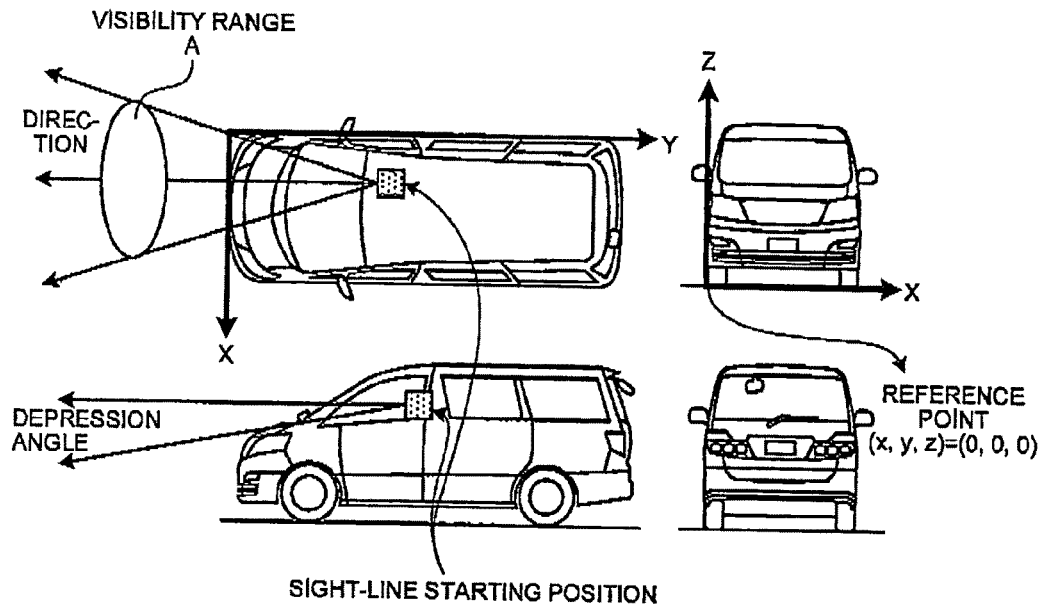
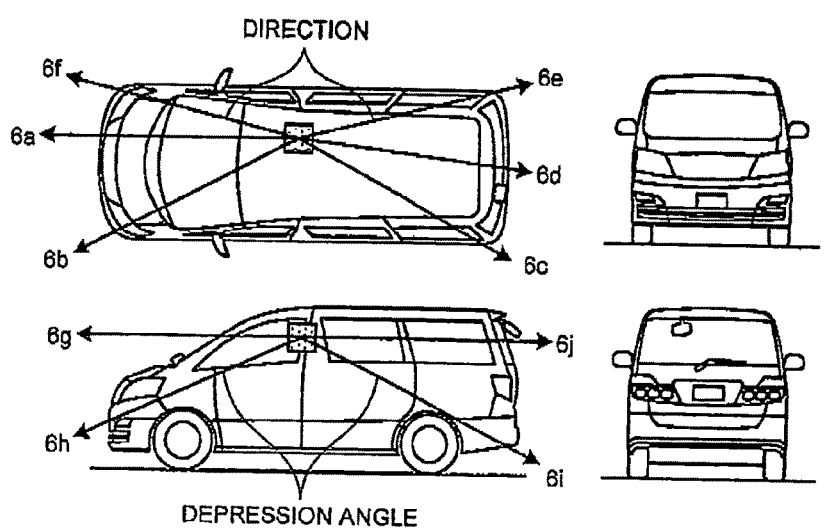

US 8,648,881 B2

METHOD AND APPARATUS FOR IMAGE PROCESSING FOR IN-VEHICLE CAMERAS

CROSS-REFERENCE TO RELATED APPLICATIONS

This application is based upon and claims the benefit of priority of the prior Japanese Patent Application No. 2008-306905, filed on Dec. 1, 2008, the entire contents of which are incorporated herein by reference.

BACKGROUND OF THE INVENTION

1. Field of the Invention

The present invention relates to an image processing apparatus, an image processing method, and a storage medium storing therein an image processing program.

2. Description of the Related Art

In recent years, to support visibility of a driver, there has been actively developed a technique of providing images captured by cameras incorporated in a vehicle to the driver, by outputting captured images to a device such as an in-vehicle display (for example, see Japanese Patent Application Laid-open No. 2007-329611).

In the conventional technique, the cameras incorporated in the vehicle include a front camera that images a front view of the vehicle, a back camera that images a back view of the vehicle, and a side camera that images blind areas which a driver cannot see in a door mirror. When parking the vehicle by moving backward, an image of the backside of the vehicle captured by the back camera is output to the in-vehicle display for the driver.

However, according to the conventional technique, the provided image may cause feeling of strangeness to the driver.

For example, the image of the backside of the vehicle captured by the back camera and output to the in-vehicle display has a uniform display mode depending on a setting position and an angle of the camera. Because the image provided to the driver is not in a mode of an image that the driver can accept naturally as if he/she actually sees the image by facing rearward, the driver may have a feeling of strangeness with regard to the sense of distance or the like.

SUMMARY OF THE INVENTION

It is an object of the present invention to at least partially solve the problems in the conventional technology.

According to an aspect of the present invention, an image processing apparatus includes: an image-conversion-parameter storage unit having stored therein in advance, as image conversion parameters to coordinate-convert images of in-vehicle cameras incorporated in an own vehicle, a plurality of directions connecting between a sight-line starting position of a driver and a plurality of predetermined positions of the own vehicle, values of a depression angle from the sight-line starting position of the driver, and a range that the driver is caused to visualize corresponding to a positioned state of the own vehicle, for each of the in-vehicle cameras incorporated at different positions of the own vehicle; a state determining unit that determines a current state of the own vehicle; an image converting unit that coordinate-converts an image captured by each in-vehicle camera, based on a result of a state determined by the state determining unit and the image conversion parameters stored in the image-conversion-parameter storage unit; and a display and output unit that outputs and displays an image converted by the image converting unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a schematic diagram for explaining image conversion parameters according to the embodiment;

DETAILED DESCRIPTION OF THE PREFERRED EMBODIMENTS

Exemplary embodiments of an image processing apparatus, an image processing method, and an image processing program according to the present invention will be explained below in detail with reference to the accompanying drawings. A case that the image processing apparatus according to the present invention is incorporated in a vehicle is explained as an embodiment of the present invention, and other embodiments included in the present invention is explained subsequently.

In the following description of the present embodiment, an outline and characteristics of the image processing apparatus and a configuration and processes of the image processing apparatus are first explained in this order, and effects of the embodiment are explained last.

The image processing apparatus according to the present embodiment outputs an image captured by cameras incorporated in a vehicle to an in-vehicle display or the like, to support visibility of a driver.

The image processing apparatus according to the present embodiment has the following characteristics. That is, the image processing apparatus has plural in-vehicle cameras incorporated at different positions in the own vehicle. By relating to a state of the own vehicle, the image processing apparatus has stored therein in advance, for each of the in-vehicle cameras, as image conversion parameters to coordinate-convert images of the cameras, directions connecting between a sight-line starting position of the driver and plural predetermined positions of the vehicle, and values of a depression angle from the sight-line starting position of the driver and a range that the driver is caused to visualize.

The image processing apparatus according to the present embodiment determines a state of the own vehicle currently positioned, upon receiving from the driver an input of a display output condition for outputting the image captured by each in-vehicle camera. The image processing apparatus further acquires an image conversion parameter based on the display output condition and the state of the own vehicle currently positioned, converts the image captured by each in-vehicle camera by using the acquired image conversion parameter, and outputs and displays the converted image.

In this way, as illustrated in FIGS. 1A to 3B, the image processing apparatus according to the present embodiment provides a driver-viewpoint image not causing any feeling of strangeness to the driver, as a visibility supporting image.

Figure 1A:
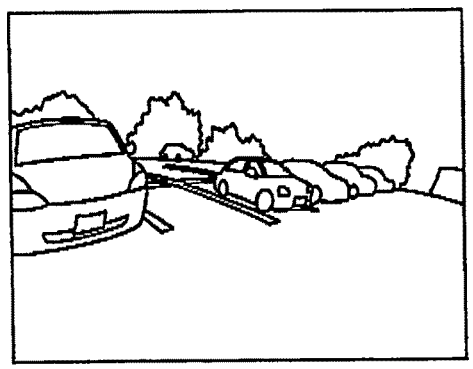
FIGS. 1A and 1B are schematic diagrams for explaining an image processing apparatus according to an embodiment of the present invention.
Figure 1B:
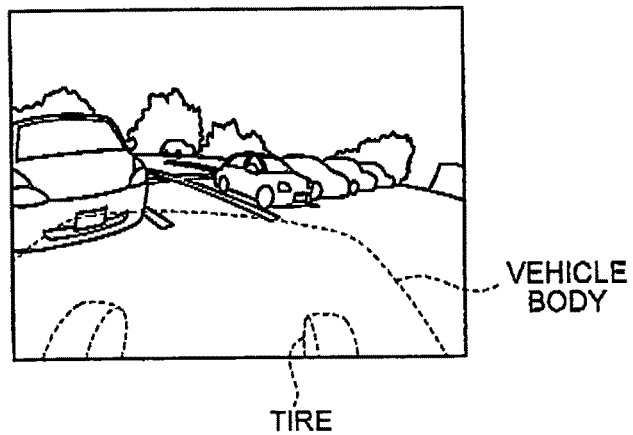

FIGS. 1A to 3B are schematic diagram for explaining the image processing apparatus according to the present embodiment. As illustrated in FIG. 1A, for example, the image processing apparatus converts an image captured by an in-vehicle front camera into a driver-viewpoint image, and displays the converted image on the display. As illustrated in FIG. 1B, data indicating a positional relationship of a vehicle body and tires can be combined with the driver-viewpoint image, and a combined image can be displayed on the display. In this case, the vehicle body and the tires are displayed transparently.

Figure 2A:
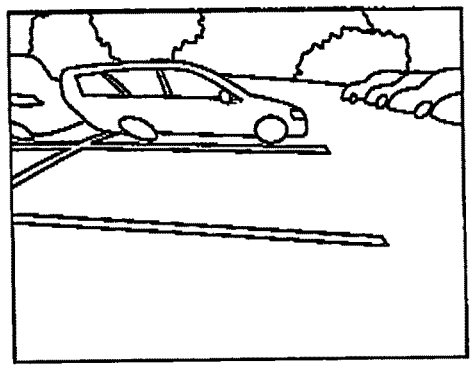
FIGS. 2A and 2B are schematic diagrams for explaining the image processing apparatus according to the embodiment.
Figure 2B:
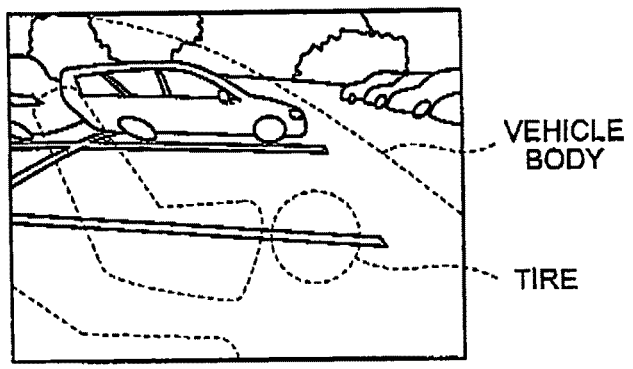

As illustrated in FIG. 2A, the image processing apparatus converts an image captured by an in-vehicle side camera into a driver-viewpoint image, and displays the converted image on the display. In a similar manner to that in FIG. 1B, as illustrated in FIG. 2B, data indicating a positional relationship of the vehicle body and the tires can be combined with the driver-viewpoint image, and a combined image can be displayed on the display.

Figure 3A:
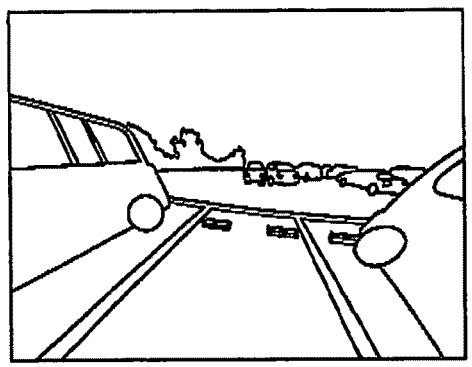
FIGS. 3A and 3B are schematic diagrams for explaining the image processing apparatus according to the embodiment.
Figure 3B:
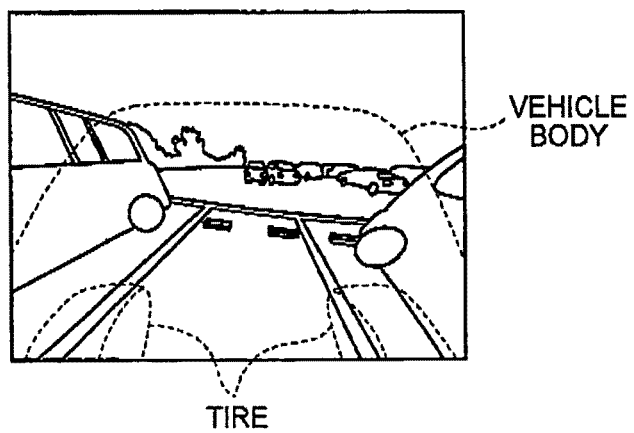

As illustrated in FIG. 3A, the image processing apparatus converts an image captured by an in-vehicle back camera into a driver-viewpoint image, and displays the converted image on the display. In a similar manner to that in FIG. 1B, as illustrated in FIG. 3B, data indicating a positional relationship of the vehicle body and the tires can be combined with the driver-viewpoint image, and a combined image can be displayed on the display.

Figure 4:
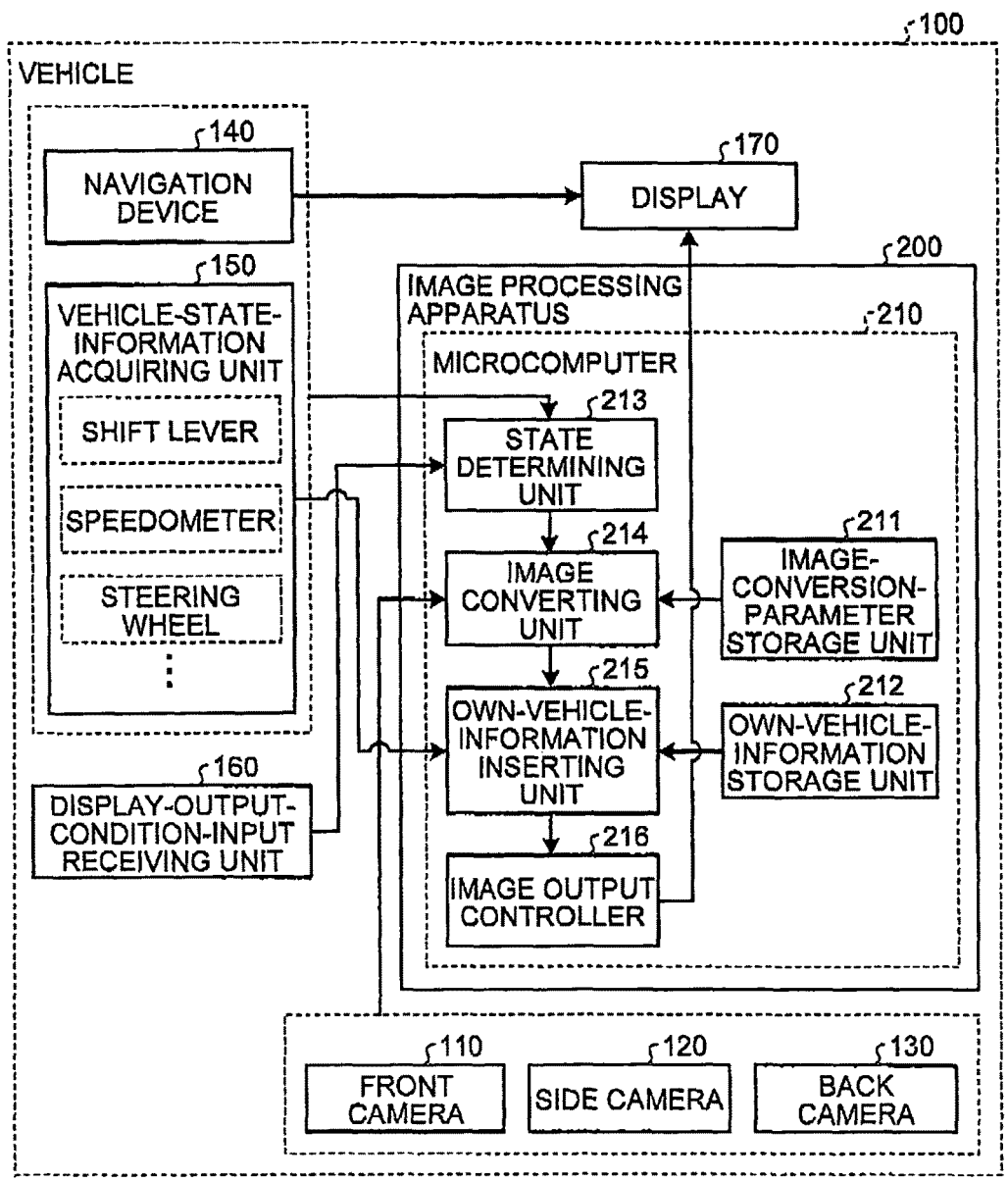
FIG. 4 depicts a configuration of the image processing apparatus according to the embodiment.

A configuration of the image processing apparatus according to the present embodiment is explained next with reference to FIG. 4. FIG. 4 depicts the configuration of the image processing apparatus according to the present embodiment.

Figure 5:
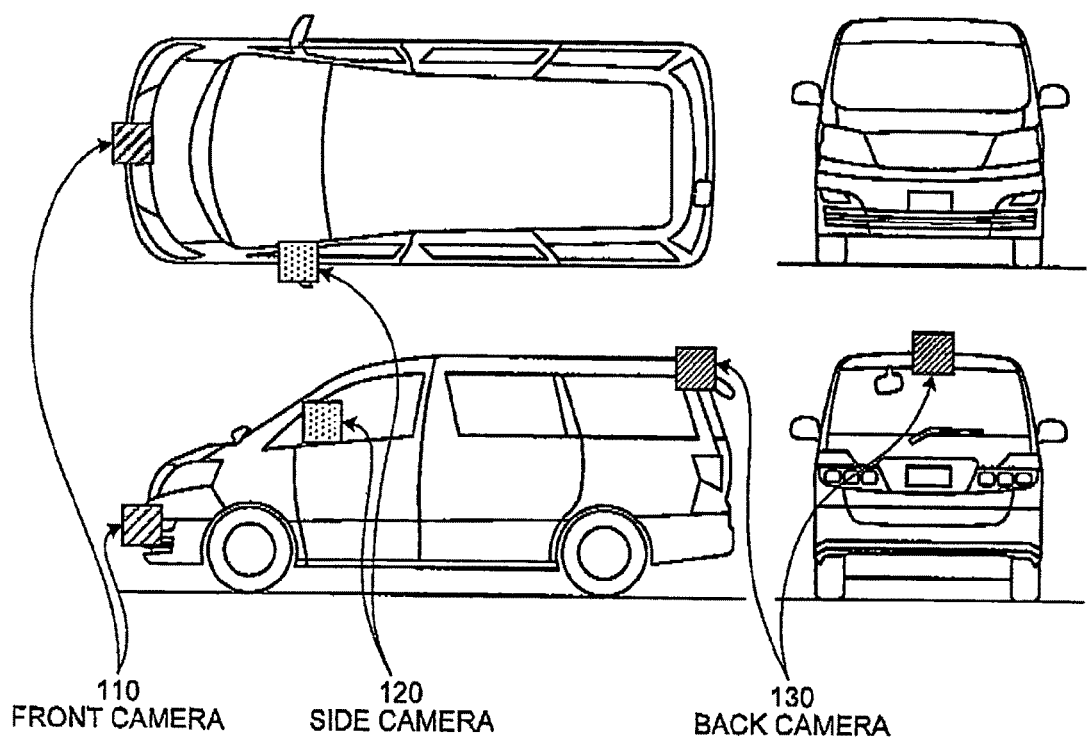
FIG. 5 depicts layout positions of in-vehicle cameras.

An image processing apparatus 200 according to the present embodiment is incorporated in a vehicle 100, together with a front camera 110, a side camera 120, and a back camera 130 illustrated in FIG. 5, and a navigation device 140, a vehicle-state-information acquiring unit 150, a display-output-condition-input receiving unit 160, and a display 170 illustrated in FIG. 4. FIG. 5 depicts layout positions of the in-vehicle cameras.

The front camera 110, the side camera 120, and the back camera 130 capture images to support visibility of a driver, and transmit captured images to the image processing apparatus 200.

The navigation device 140 communicates with a global positioning system (GPS) artificial satellite, and transmits to the image processing apparatus 200 navigation information (such as a current position, a moving direction, a moving speed, a departing location, and a destination) generated by using map data and the like held in the navigation device 140.

The vehicle-state-information acquiring unit 150 transmits to the image processing apparatus 200 vehicle state information acquired from a shift lever, a speedometer, and a steering wheel. For example, the vehicle-state-information acquiring unit 150 acquires information of a shift range from the shift lever (for example, "D" indicating drive (move forward), "R" indicating rear (move backward), and "P" indicating parking, in the case of an automatic vehicle), and transmits the acquired information to the image processing apparatus 200. The vehicle-state-information acquiring unit 150 acquires information of a running speed from the speedometer, and transmits the acquired information to the image processing apparatus 200, and acquires information of a steering angle from the steering wheel, and transmits the acquired information to the image processing apparatus 200.

The display-output-condition-input receiving unit 160 receives an input of a display output instruction of an, image captured by the in-vehicle camera from the driver, and transmits the received information to the image processing apparatus 200. For example, the display-output-condition-input receiving unit 160 receives an input of a display output instruction of an image captured by the front camera 110, and an input of a display output instruction of an image captured by the back camera 130.

The display 170 outputs and displays an image transmitted from the image processing apparatus 200 corresponding to a display output condition from the driver. The display 170 also displays navigation information sent from the navigation device 140.

As illustrated in FIG. 4, the image processing apparatus 200 has a microcomputer 210. The microcomputer 210 processes images acquired by the front camera 110, the side camera 120, and the back camera 130, and performs a process of converting the images into driver-viewpoint images. As illustrated in FIG. 4, the microcomputer 210 includes an image-conversion-parameter storage unit 211, an own-vehicle-information storage unit 212, a state determining unit 213, an image converting unit 214, an own-vehicle-information inserting unit 215, and an image output controller 216.

The image-conversion-parameter storage unit 211 has stored therein in advance directions (see 6a to 6f in FIG. 6, for example) connecting between a sight-line starting position of the driver and plural predetermined positions of the own vehicle for each in-vehicle camera incorporated in the own vehicle such as the front camera 110 corresponding to a state of the own vehicle, as image conversion parameters to coordinate-convert images captured by the in-vehicle cameras.

Furthermore, the image-conversion-parameter storage unit 211 has stored therein in advance angles of depression (see 6g to 6j in FIG. 6, for example) from the sight-line starting position of the driver corresponding to a state of the own vehicle, as image conversion parameters to coordinate-convert images captured by the in-vehicle cameras.

Further, the image-conversion-parameter storage unit 211 has stored therein in advance a value of a range that the driver is caused to visualize (a visibility range) corresponding to a state of the own vehicle, as image conversion parameters to coordinate-convert images captured by the in-vehicle cameras. The state of the own vehicle means, for example, a state that the vehicle is heading to an intersection of poor visibility, and a state that the vehicle is to be parked at a parking. FIG. 6 is a schematic diagram for explaining image conversion parameters according to the present embodiment.

The own-vehicle-information storage unit 212 has stored therein in advance vehicle body data concerning a vehicle body such as the shape and size of the own vehicle and the shape and size of tires.

The state determining unit 213 determines a state of the own vehicle currently positioned based on the display output condition from the display-output-condition-input receiving unit 160, the navigation information from the navigation device 140, and the vehicle state information from the vehicle-state-information acquiring unit 150, and transmits a determination result to the image converting unit 214. Specifically, upon receiving a display output condition of outputting and displaying an image captured by the back camera 130 from the display-output-condition-input receiving unit 160, the state determining unit 213 determines a current state of the own vehicle based on the navigation information and the vehicle state information. For example, when the navigation information indicates that the own vehicle is positioned in a parking and the information of the speedometer acquired as the vehicle state information indicates that the vehicle is moving at a slow speed, the state determining unit 213 determines that the vehicle is to be parked.

After determining a state of the own vehicle, the state determining unit 213 transmits to the image converting unit 214 the display output condition of outputting and displaying the image captured by the back camera 130, and the state that the own vehicle is to be parked.

The image converting unit 214 receives from the state determining unit 213 the display output condition of outputting and displaying the image captured by the back camera 130, and the state that the own vehicle is to be parked. The image converting unit 214 then acquires image conversion parameters corresponding to the display output condition and the state, from the image-conversion-parameter storage unit 211.

For example, as illustrated in FIG. 6, the image converting unit 214 acquires from the image-conversion-parameter storage unit 211 image conversion parameters containing coordinates (40, 2400, 1600) of a sight-line starting position of the driver, a direction of 225 degrees (an angle corresponding to a direction of 6c in FIG. 6, for example), a depression angle of 225 degrees (an angle corresponding to a direction of 6i in FIG. 6, for example), and a visibility range of 190 degrees (an angle corresponding to A in FIG. 6, for example). The image conversion parameters acquired by the image converting unit 214 are parameters for generating a driver-viewpoint image, by coordinate-converting processed images of the images captured by the front camera 110, the side camera 120, and the back camera 130 into an image the driver can actually acquire by viewing left-rearward of the vehicle from a driver position.

The image converting unit 214 coordinate-converts processed images of the images captured by the front camera 110, the side camera 120, and the back camera 130, by using the image conversion parameters acquired from the image-conversion-parameter storage unit 211, and generates a driver-viewpoint image. The image converting unit 214 transmits the driver-viewpoint image to the own-vehicle-information inserting unit 215.

The own-vehicle-information inserting unit 215 receives the driver-viewpoint image from the image converting unit 214, and acquires vehicle body data such as the shape and size of the own vehicle and the shape and size of tires from the own-vehicle-information storage unit 212. The own-vehicle-information inserting unit 215 combines data indicating a positional relationship of the vehicle body and tires with the driver-viewpoint image, and transmits a combined image to the image output controller 216. In combining a tire positional relationship with the driver-viewpoint image, the own-vehicle-information inserting unit 215 acquires information of a steering angle from the vehicle-state-information acquiring unit 150, and combines tire data in a state reflecting a current direction of the tires.

Upon receiving from the own-vehicle-information inserting unit 215 the driver-viewpoint image obtained by combining data indicating a positional relationship of the vehicle body and tires with the driver-viewpoint image, the image output controller 216 outputs the driver-viewpoint image to the display 170 and displays the image for the driver.

Figure 7:
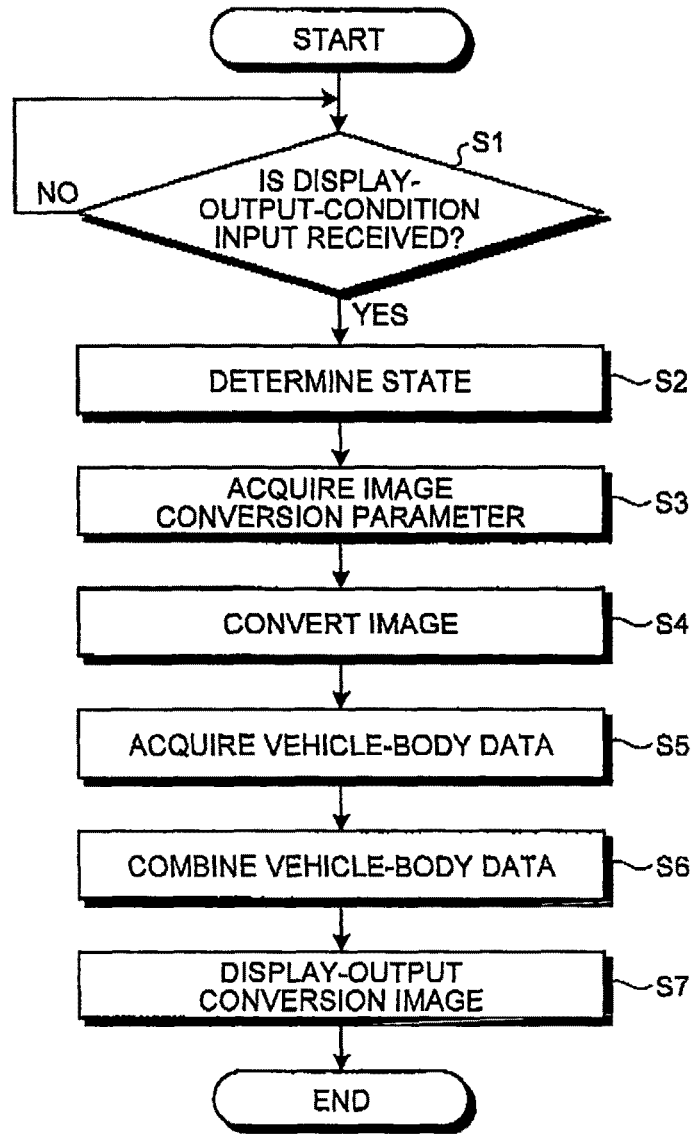
FIG. 7 is a flowchart of a process performed by the image processing apparatus according to the embodiment.

A flow of a process performed by the image processing apparatus according to the present embodiment is explained with reference to FIG. 7. FIG. 7 is a flowchart of the process performed by the image processing apparatus according to the present embodiment.

As illustrated in FIG. 7, the state determining unit 213 waits until receiving an input of a display output condition from the display-output-condition-input receiving unit 160 (Step S1). When the state determining unit 213 receives a display output condition of outputting and displaying an image captured by the back camera 130 (YES at Step S1), the state determining unit 213 determines a current state of the own vehicle based on the navigation information and the vehicle state information (Step S2). For example, when the navigation information indicates that the own vehicle is positioned in a parking and the information of the speedometer acquired as the vehicle state information indicates that the vehicle is moving at a slow speed, the state determining unit 213 determines that the vehicle is to be parked.

After determining the state of the own vehicle, the state determining unit 213 transmits to the image converting unit 214 the display output condition of outputting and displaying the image captured by the back camera 130, and the state that the own vehicle is to be parked.

The image converting unit 214 receives from the state determining unit 213 the display output condition of outputting and displaying the image captured by the back camera 130, and the state that the own vehicle is to be parked. The image converting unit 214 then acquires image conversion parameters corresponding to this display output condition and the state, from the image-conversion-parameter storage unit 211 (Step S3).

For example, as illustrated in FIG. 6, the image converting unit 214 acquires from the image-conversion-parameter storage unit 211 image conversion parameters containing coordinates (40, 2400, 1600) of a sight-line starting position of the driver, a direction of 225 degrees (an angle corresponding to the direction of 6c in FIG. 6, for example), a depression angle of 225 degrees (an angle corresponding to the direction of 6i in FIG. 6, for example), and a visibility range of 190 degrees (an angle corresponding to A in FIG. 6, for example). The image conversion parameters acquired by the image converting unit 214 are parameters for generating a driver-viewpoint image, by coordinate-converting processed images of images captured by the front camera 110, the side camera 120, and the back camera 130 into an image the driver acquires by viewing left-rearward of the vehicle from a driver position.

The image converting unit 214 coordinate-converts the processed images of the images captured by the front camera 110, the side camera 120, and the back camera 130, by using the image conversion parameters acquired from the image-conversion-parameter storage unit 211 (Step S4), and generates a driver-viewpoint image. The image converting unit 214 transmits the driver-viewpoint image to the own-vehicle-information inserting unit 215.

The own-vehicle-information inserting unit 215 receives the driver-viewpoint image from the image converting unit 214, and acquires vehicle body data such as the shape and size of the own vehicle and the shape and size of tires from the own-vehicle-information storage unit 212 (Step S5). The own-vehicle-information inserting unit 215 combines data indicating a positional relationship of the vehicle body and tires with the driver-viewpoint image (Step S6), and transmits a combined image to the image output controller 216.

Upon receiving from the own-vehicle-information inserting unit 215 the driver-viewpoint image obtained by combining data indicating a positional relationship of the vehicle body and tires with the driver-viewpoint image, the image output controller 216 outputs the driver-viewpoint image to the display 170 (Step S7) and displays the image for the driver.

As described above, according to the present embodiment, a driver-viewpoint image not causing any feeling of strangeness to the driver can be provided as a visibility supporting image.

Furthermore, in the present embodiment, when the display-output-condition-input receiving unit 160 receives an input of a display output condition different from that of the last time, the following process is performed.

Figure 8:
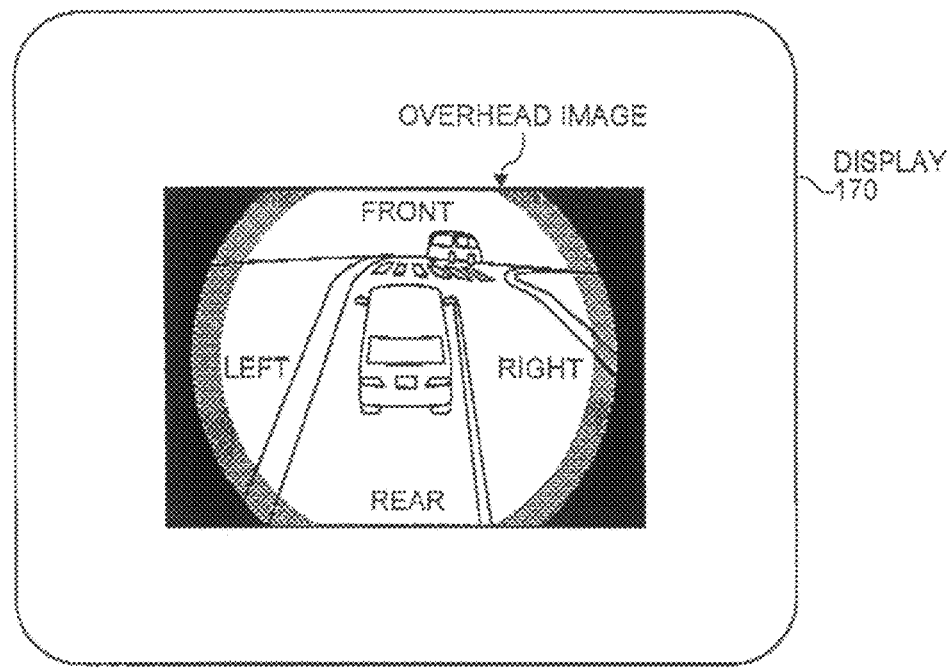
FIG. 8 is a schematic diagram for explaining an overhead image according to the embodiment.

It is assumed that an input of a display output condition of outputting and displaying an image captured by the front camera 110 different from a display output condition of outputting and displaying an image captured by the back camera 130 is received. In this case, the state determining unit 213 performs a state determination again, and the image converting unit 214 performs a conversion process again, and displays an obtained driver-viewpoint image on the display. Before this process, an overhead image of the entirety of the vehicle 100 viewed from above the vehicle is output to the display 170, as illustrated in FIG. 8. After displaying the overhead image, a driver-viewpoint image is displayed by switching from the overhead image.

This arrangement prevents the driver from having a mistaken sense of the view due to switching of the viewpoint of the image, and helps the driver to correctly recognize the image. FIG. 8 is a schematic diagram for explaining an overhead image according to the present embodiment. In place of the overhead image described above, an image of the front view of the vehicle can be displayed. In this case, the driver can be also prevented from having a mistaken sense of the view, and can easily recognize the displayed image.

As explained below, the image converting unit 214 coordinate-converts processed images of the images captured by the front camera 110, the side camera 120, and the back camera 130, by using the image conversion parameters corresponding to a display output condition and a state determination result, and generates a driver-viewpoint image.

For example, upon receiving an input of a display output condition of outputting and displaying an image captured by the side camera and acquiring a state determination result that the own vehicle passes by an oncoming vehicle on a narrow road, the image converting unit 214 acquires image conversion parameters containing an angle of "direction" passing a left front end of the own vehicle (angle corresponding to a direction of 6b in FIG. 6, for example), "depression angle" of 1.0 degrees, and "visibility range" of 50 degrees (close to human visibility). The image converting unit 214 coordinate-converts processed images of the images captured by the front camera 110, the side camera 120, and the back camera 130, by using the image conversion parameters, and generates a driver-viewpoint image.

In the present embodiment, when the driver performs a steering operation during a display output of the driver-viewpoint image, the image converting unit 214 can coordinate-convert the image captured by the front camera 110 or the like corresponding to the steering operation, and regenerate a driver-viewpoint image, and output and display the regenerated image.

In the present embodiment, it is explained that data indicating a positional relationship of the vehicle body and tires is combined with the driver-viewpoint image. Alternatively, data indicating a positional relationship of the vehicle body and tires can be directly combined with an image captured by an in-vehicle camera.

In the present embodiment, by detecting an obstacle around the vehicle 100, a driver-viewpoint image in a detected direction of the obstacle can be displayed. For example, when an obstacle approaches the vehicle 100, a sensor such as a clearance sonar is used to detect the presence of the obstacle. A driver-viewpoint image is generated by coordinate-converting an image captured by the front camera 110 or the like, by using image conversion parameters in the detected direction of the obstacle. The generated image is output and displayed.

In the present embodiment, the image conversion parameters stored in the image-conversion-parameter storage unit 211 can be changed corresponding to a size of the vehicle (such as minivan, sedan, wagon, and light car), a setting position of a steering wheel (such as right-hand steering wheel and left-hand steering wheel), a body frame of the driver (such as body height and seating height), and a seat position (such as up-and-down direction and forward-and-backward direction). The image conversion parameters stored in the image-conversion-parameter storage unit 211 can be changed corresponding to a setting change content sent by the driver.

The respective constituent elements of the image processing apparatus 200 illustrated in FIG. 4 are functionally conceptual, and physically the same configuration as illustrated in the drawing is not always necessary. That is, the specific mode of distribution and integration of the image processing apparatus 200 is not limited to that illustrated in FIG. 4, and for example, the state determining unit 213, the image converting unit 214, and the own-vehicle-information inserting unit 215 can be integrally configured. In this way, all or a part of the image processing apparatus 200 can be functionally or physically distributed or integrated in an arbitrary unit, according to various kinds of load and the status of use. In addition, all or an arbitrary part of each processing function performed by the image processing apparatus 200 (see FIG. 7, for example) can be realized by a central processing unit (CPU) and by a program analyzed and executed in the CPU, or realized as hardware by a wired logic.

Figure 9:
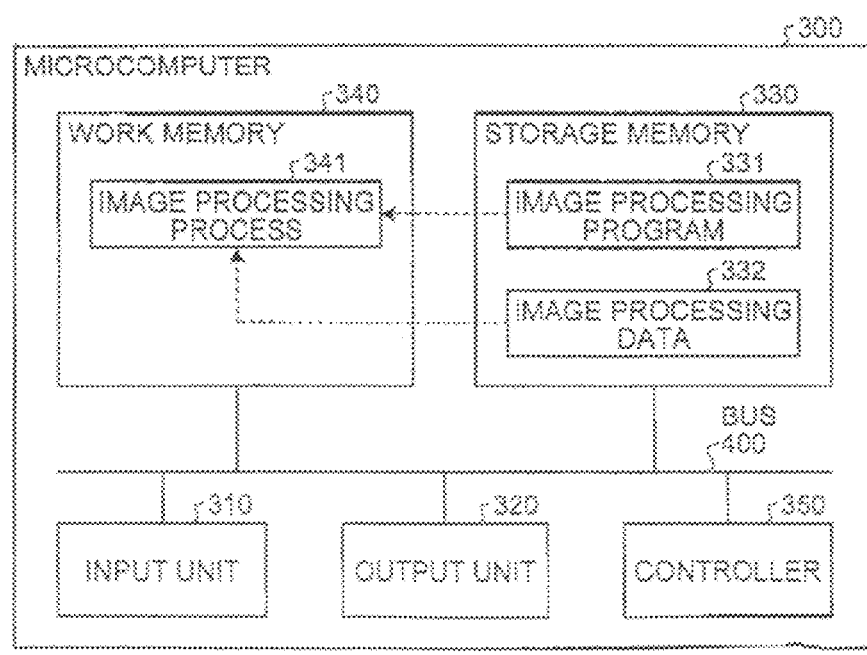
FIG. 9 depicts a microcomputer that executes an image processing program.

Various kinds of processes of the image processing apparatus 200 (see FIG. 7, for example) explained in the present embodiment can be achieved by executing programs prepared in advance by a microcomputer or the like incorporated in an in-vehicle control electronic control unit (ECU). Accordingly, an example of a microcomputer that executes an image processing program having a similar function to that of the image processing apparatus 200 explained in the present embodiment is explained with reference to FIG. 9. FIG. 9 depicts a microcomputer that executes the image processing program.

As illustrated in FIG. 9, a microcomputer 300 is configured to include an input unit 310, an output unit 320, a storage memory 330, a work memory 340, and a controller 350, by connecting these units by a bus 400.

The input unit 310 receives an input of various data from a user. The output unit 320 displays various kinds of information. The storage memory 330 stores information necessary for the controller 350 to execute various kinds of processes. The work memory 340 temporarily stores various kinds of information. The controller 350 executes various kinds of operations.

As illustrated in FIG. 9, the storage memory 330 has stored therein in advance an image processing program 331 that exhibits functions similar to those of processors of the image processing apparatus 200 according to the present embodiment, and image processing data 332. The image processing program 331 can be appropriately distributed and stored in a storage unit of another computer communicably connected via a network.

The controller 350 reads the image processing program 331 from the storage memory 330, and expands the program in the work memory 340. With this arrangement, the image processing program 331 can function as an image processing process 341 as illustrated in FIG. 9. That is, the image processing process 341 reads the image processing data 332 or the like from the storage memory 330, expands the read data in a region allocated to itself in the work memory 340, and performs various kinds of processes based on the expanded data.

The image processing process 341 corresponds to each process performed by process functional units of the microcomputer 210 illustrated in FIG. 4 (i.e., the state determining unit 213, the image converting unit 214, the own-vehicle-information inserting unit 215, and the image output controller 216).

The image processing program 331 is not necessarily required to be initially stored in the storage memory 330. Each program can be stored beforehand in a "portable physical medium", such as a flexible disk (FD), a compact disc read only memory (CD-ROM), a digital versatile disc (DVD), a magnetic optical disc, and an integrated circuit (IC) card, to be inserted into the microcomputer 300, and the microcomputer 300 can execute the program by reading it from these portable physical mediums.

The image processing apparatus 200 according to the present embodiment realizes the following image processing method.

The image processing method thus realized includes: a display-output-condition-input receiving step of receiving an input of a display output condition from a driver to output and display an image captured by each of in-vehicle cameras incorporated in an own vehicle (see Step S1 in FIG. 7, for example); a state determining step of determining a current state of the own vehicle (see Step S2 in FIG. 7, for example); an image converting step of coordinate-converting images captured by the in-vehicle cameras, by acquiring image conversion parameters corresponding to a display output condition received at the display-output-condition-input receiving step and a state determined at the state determining step from an image-conversion-parameter storage unit that stores, as image conversion parameters for coordinate-converting images captured by the in-vehicle cameras, directions connecting between a sight-line starting position of a driver and plural predetermined positions of the own vehicle, and values of a depression angle from the sight-line starting position of the driver and a range that the driver is caused to visualize corresponding to a positioned scene of the own vehicle, for each of the in-vehicle cameras incorporated at different positions of the own vehicle, and by using the acquired image conversion parameters (see Steps S3 and S4 in FIG. 7, for example); and a displaying and outputting step of outputting and displaying an image obtained by conversion at the image converting step.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
   an image-conversion-parameter storage unit having stored therein in advance, as image conversion parameters to coordinate-convert images of in-vehicle cameras incorporated in an own vehicle, a plurality of directions connecting between a sight-line starting position of a driver and a plurality of predetermined positions of the own vehicle, values of a depression angle from the sight-line starting position of the driver, and a range that the driver is caused to visualize corresponding to a positioned state of the own vehicle, for each of the in-vehicle cameras incorporated at different positions of the own vehicle;
   a state determining unit that determines a current state of the own vehicle;
   an image converting unit that coordinate-converts an image captured by each in-vehicle camera, based on a result of a state determined by the state determining unit and the image conversion parameters stored in the image-conversion-parameter storage unit;
   a display and output unit that outputs and displays an image converted by the image converting unit;
   a display-output-condition-input receiving unit that receives from a driver an input of a display output condition for outputting and displaying an image captured by each in-vehicle camera; and
   an overhead-image display unit that temporarily displays an overhead image of entirety of the own vehicle when the display-output-condition-input receiving unit receives an input of a first display output condition different from a second display output condition of last time, wherein
   the overhead image is inserted between a first image converted in the first display output condition and a second image converted in the second display output condition, before the first image is displayed, and
   the first image and the second image are respectively one and another out of an image acquired from the driver's viewpoint viewing frontward of the own vehicle from a driver position, an image acquired from the driver's viewpoint viewing backward of the own vehicle from the driver position, and an image acquired from the driver's viewpoint viewing sideward of the own vehicle from the driver position.

2. The image processing apparatus according to claim 1, wherein the state determining unit determines a current state of the own vehicle by using one or a plurality of pieces of information concerning a driving operation of the vehicle, vehicle speed information, and navigation information.

3. The image processing apparatus according to claim 1, further comprising a parameter-setting changing unit that changes a setting of the image conversion parameters stored in the image-conversion-parameter storage unit, based on a size of the own vehicle, a setting position of a steering wheel, a body frame of a driver, and a seat position.

4. The image processing apparatus according to claim 1, further comprising a parameter-setting-change receiving unit that receives from a driver a setting change of the image conversion parameters stored in the image-conversion-parameter storage unit.

5. The image processing apparatus according to claim 1, further comprising an own-vehicle-information inserting unit that inserts information indicating a positional relationship of the own vehicle into an image converted by the image converting unit, wherein
   the display and output unit outputs and displays an image into which information indicating a positional relationship of the own vehicle is inserted by the own-vehicle-information inserting unit.

6. An image processing method applied to an image processing apparatus, comprising:

determining a current state of an own vehicle;

coordinate-converting images captured by in-vehicle cameras incorporated at different positions of the own vehicle, based on image conversion parameters for coordinate-converting images acquired by the in-vehicle cameras and based on a state determination result at the determining, for each of the in-vehicle cameras, corresponding to a positioned scene of the own vehicle, the image conversion parameters being directions connecting between a sight-line starting position of a driver and a plurality of predetermined positions of the own vehicle, values of a depression angle from the sight-line starting position of the driver, and a range that the driver is caused to visualize;

outputting and displaying an image converted at the converting;

receiving from a driver an input of a display output condition for outputting and displaying an image captured by each in-vehicle camera; and temporarily displaying an overhead image of entirety of the own vehicle when the display-output-condition-input receiving unit receives an input of a first display output condition different from a second display output condition of last time, wherein the overhead image is inserted between a first image converted in the first display output condition and a second image converted in the second display output condition, before the first image is displayed, and the first image and the second image are respectively one and another out of an image acquired from the driver's viewpoint viewing frontward of the own vehicle from a driver position, an image acquired from the driver's viewpoint viewing backward of the own vehicle from the driver position, and an image acquired from the driver's viewpoint viewing sideward of the own vehicle from the driver position.

* * * * *